(12) United States Patent
Uemoto et al.

(10) Patent No.: US 7,332,244 B2
(45) Date of Patent: Feb. 19, 2008

(54) BATTERY MODULE

(75) Inventors: Seiichi Uemoto, Izumi (JP); Kenji Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 338 days.

(21) Appl. No.: 10/259,122

(22) Filed: Sep. 27, 2002

(65) Prior Publication Data

US 2003/0064283 A1    Apr. 3, 2003

(30) Foreign Application Priority Data

Sep. 28, 2001    (JP)    ............... 2001-301527

(51) Int. Cl.
  H01M 2/08    (2006.01)
  H01M 10/50  (2006.01)
  H01M 2/12    (2006.01)
  H01M 2/02    (2006.01)

(52) U.S. Cl. .................. 429/185; 429/53; 429/94; 429/149; 429/159; 429/175; 429/177

(58) Field of Classification Search .............. 429/7, 429/27, 53, 54, 56, 61, 62, 64, 71, 94, 97, 429/99, 100, 175; 264/279
See application file for complete search history.

(56) References Cited

U.S. PATENT DOCUMENTS

| | | | |
|---|---|---|---|
| 1,152,247 A | 8/1915 | Walker | |
| 3,352,721 A * | 11/1967 | LeCouffe | ............. 264/279 |
| 3,844,841 A | 10/1974 | Baker | |
| 4,107,402 A | 8/1978 | Dougherty et al. | |
| 4,339,049 A | 7/1982 | Gillespie | |
| 4,693,535 A | 9/1987 | Frode | |
| 5,346,786 A * | 9/1994 | Hodgetts | ............. 429/159 |
| 5,370,711 A * | 12/1994 | Audit et al. | ............. 29/623.1 |
| 5,456,994 A | 10/1995 | Mita | |
| 5,585,207 A * | 12/1996 | Wakabe et al. | ............. 429/178 |
| 5,639,571 A | 6/1997 | Waters et al. | |
| 5,641,589 A | 6/1997 | Grivel et al. | |
| 5,795,664 A * | 8/1998 | Kelly | ............. 429/7 |
| 5,981,108 A | 11/1999 | Matsumura et al. | |
| 5,985,483 A | 11/1999 | Verhoog et al. | |
| 6,455,190 B1 | 9/2002 | Inoue et al. | |
| 6,818,343 B1 | 11/2004 | Kimoto et al. | |
| 2003/0049526 A1 | 3/2003 | Hottori et al. | |
| 2003/0118898 A1 | 6/2003 | Kimura et al. | |

FOREIGN PATENT DOCUMENTS

| | | |
|---|---|---|
| FR | 2723181 A1 * | 2/1996 |
| JP | 09-266016 | 10/1997 |
| JP | 09266016 A * | 10/1997 |
| JP | 11086810 A * | 3/1999 |
| JP | 11-176487 | 7/1999 |

* cited by examiner

*Primary Examiner*—Jonathan Crepeau
*Assistant Examiner*—Robert Hodge
(74) *Attorney, Agent, or Firm*—Jordan and Hamburg LLP

(57) ABSTRACT

A battery case is formed by juxtaposing a plurality of electrode plate group housing chambers. An electrolyte-impregnated electrode plate group is housed in each of the housing chambers. A side plate is arranged in abutment with each side face of the battery case. The respective side faces are faced with the openings of the electrode plate group housing chambers. This makes it possible to close the openings of the electrode plate group housing chambers. Thus, the cells and the battery module are fabricated concurrently.

21 Claims, 11 Drawing Sheets

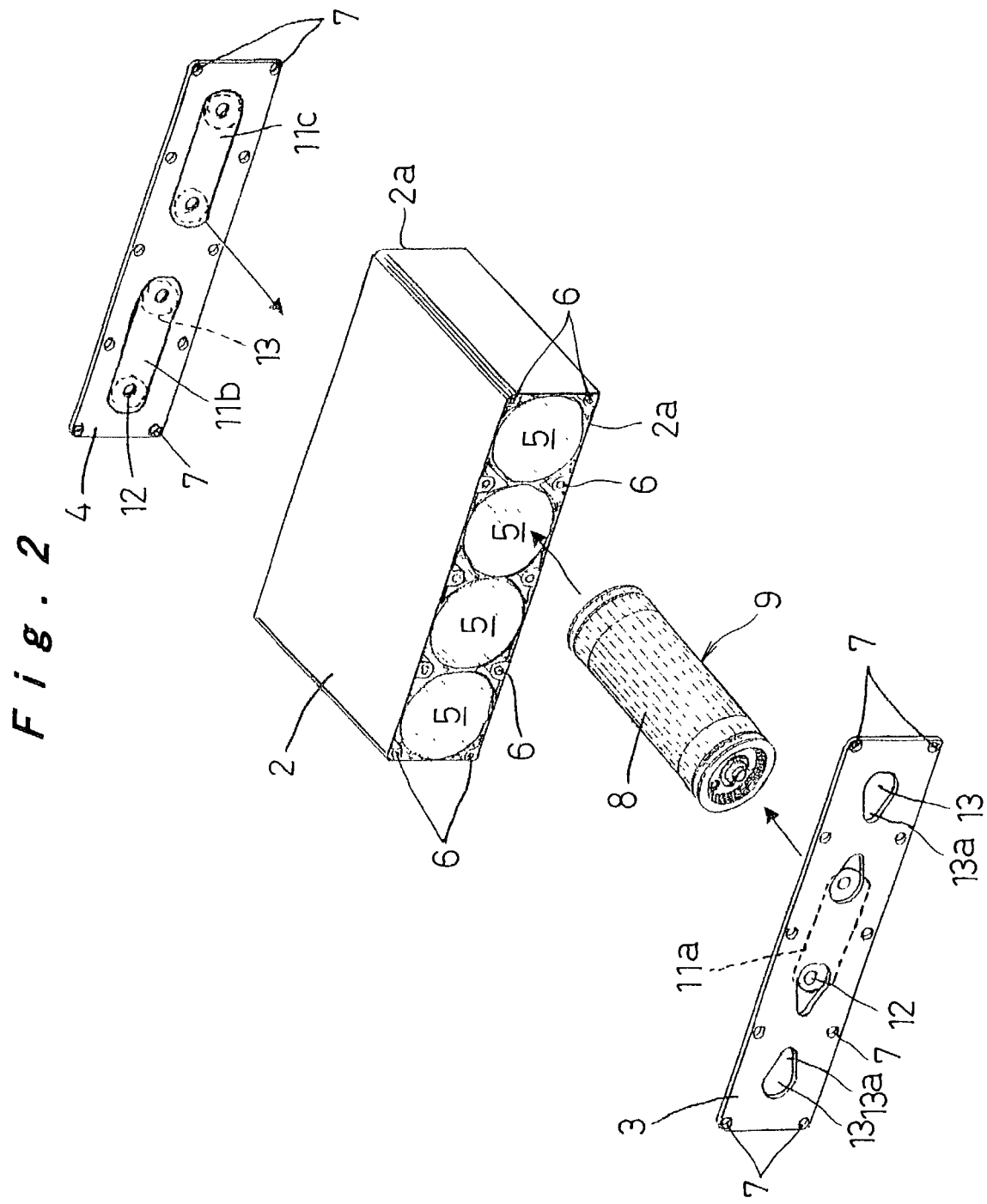

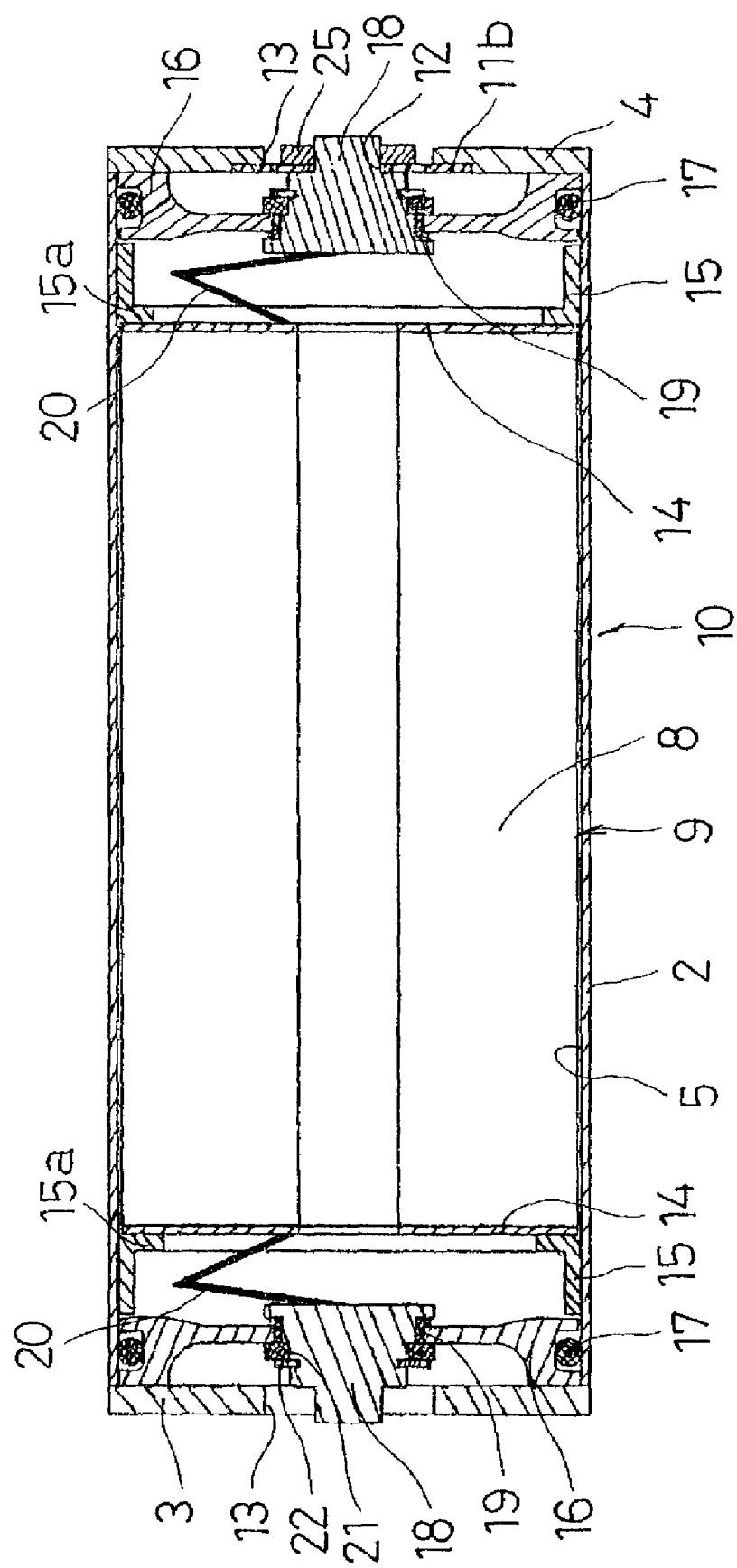

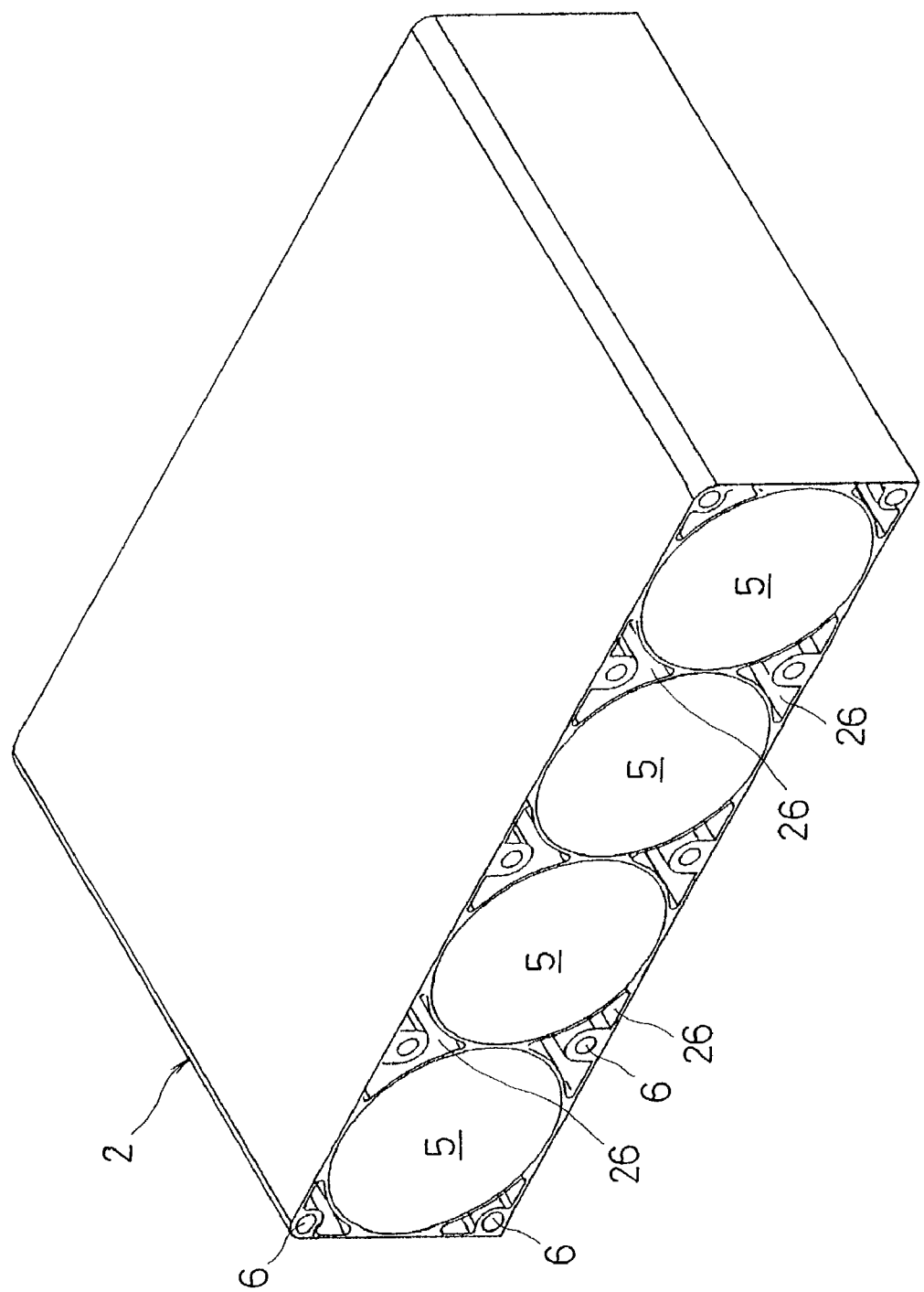

BATTERY MODULE

The present disclosure relates to subject matter contained in priority Japanese Patent Application No. 2001-301527, filed on Sep. 28, 2001, the contents of which is herein expressly incorporated by reference in its entirety.

BACKGROUND OF THE INVENTION

1. Field of the Invention

The present invention relates to a battery module, and more particularly to a battery module that is constructed by incorporating a plurality of cells in a single battery case.

2. Description of Related Art

FIG. 11 shows a conventional battery module 41 composed of a combination of a plurality of cells. In this construction, a plurality of cells 42 are juxtaposed, with a spacing secured in between for a cooling purpose. A pair of battery fixing plates 43 and 44 are disposed at the opposite ends of the array of the plurality of cells 42 in such a way as to have sandwiched therebetween the cells 42. The reference numeral 45 denotes a coupling rod for joining together the pair of battery fixing plates 43 and 44.

Moreover, Japanese Patent Laid-Open Publication Nos. Hei. 9-266016 and Hei. 11-176487 each disclose a battery module constructed by placing a plurality of cells in a battery case, wherein a cooling medium passage or a Peltier element is disposed in the battery case to control the temperature of the battery.

However, any of the above-described conventional battery modules has proved to pose problems as follows. Each of the incorporated cells is separately housed, together with an electrolyte and an electrode plate group acting as a power-generating element, in a cell case. That is, the cells are designed to be usable singly. Such cells are juxtaposed with a spacing secured in between for a cooling purpose, and the array of the cells is sandwiched between the fixing plates or housed in a battery case. The battery module constructed in this way inevitably has an unduly large volume. What is worse, to hold a plurality of independent cells securely, an extra component such as a fixing plate or a battery case is required, and thus the number of assembly man-hours is increased. This results in an undesirable increase in the cost.

SUMMARY OF THE INVENTION

The present invention has been devised in light of the above-described problems with the conventional art, and accordingly an object of the present invention is to provide a battery module that is made compact by arranging a plurality of cells at considerably small intervals, and succeeds in cost cutting by achieving a remarkable reduction in the numbers of constituent components and assembly steps.

To achieve the above object, according to the present invention, there is provided a battery module including: a battery case formed by juxtaposing a plurality of electrode plate group housing chambers; an electrolyte-impregnated electrode plate group housed in each of the electrode plate group housing chambers, for constituting a cell; and a side plate arranged in abutment with each of side faces of the battery case with which openings of the electrode plate group housing chambers are faced, for closing the openings of the housing chambers. Specifically, the electrode plate group is housed in each of the electrode plate group housing chambers of the battery case, and subsequently an electrolyte is poured therein. Then, the opening of the electrode plate group housing chamber is closed by the side plate. Thus, the cells and the battery module are fabricated concurrently. Since the battery case for accommodating the cells serves also as a holding member for holding the cells, a remarkable reduction in the numbers of constituent components and assembly steps is achieved. This makes cost cutting possible. Moreover, since the battery case can be fabricated by a drawing process or the like, further cost reduction can be achieved.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 2 is an exploded perspective view showing the battery module;

FIG. 3 is a longitudinal sectional view showing the battery module;

FIGS. 4A and 4B are views showing a sealing member employed in the first embodiment, in which FIG. 4A is a perspective view as seen from the outside of the battery case, and FIG. 4B is a perspective view as seen from the inside of the battery case;

FIG. 5 is a perspective view showing a battery case of a battery module according to a second embodiment of the invention;

DETAILED DESCRIPTION OF THE PREFERRED EMBODIMENTS (First Embodiment)

Hereinafter, a first embodiment of the battery module of the present invention will be described with reference to FIGS. 1 through 4B.

Figure 1:
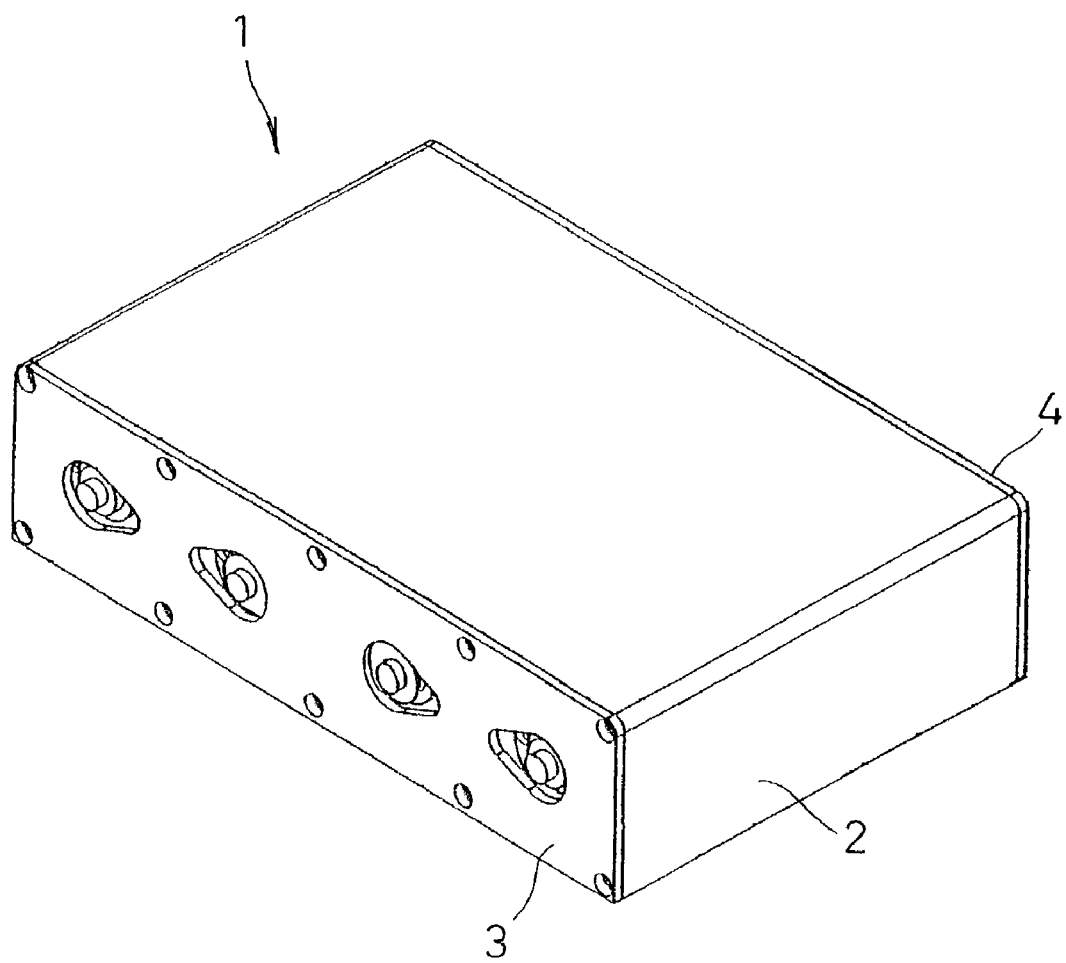
FIG. 1 is a perspective view showing a battery module according to a first embodiment of the present invention.

In FIGS. 1 and 2, the reference numeral 1 denotes a battery module. An exterior of the battery module 1 is composed of a prismatic battery case 2, and side plates 3 and 4 attached to a pair of opposite side faces 2a of the battery case 2. The battery case 2 is preferably made of aluminum or aluminum alloy, or other material whose thermal conductivity is higher than that of a steel material. As shown in FIG. 2, the battery case 2 is formed by juxtaposing four pieces of cylindrical electrode plate group housing chambers 5. Around the openings at the opposite ends of the electrode plate group housing chamber 5 are formed mounting holes 6 for mounting the side plates 3 and 4, so that the openings at the opposite ends of the housing chamber 5 are closed by the side plates 3 and 4. The reference numeral 7 denotes mounting holes which are formed in the side plates 3 and 4 so as to face their corresponding mounting hole 6. As shown in FIG. 3, in each of the electrode plate group housing chambers 5 is placed a battery element 9 having an electrolyte-impregnated electrode plate group 8 as a principal constituent element, thus constituting a cell 10.

The side plates 3 and 4 are each formed of an insulative synthetic resin plate. The side plate 3 includes a connecting plate 11a for providing connection between the middle two cells 10, whereas the side plate 4 includes connecting plates 11b and 11c for providing connection between the outer two cells 10. These connecting plates 11a to 11c are formed integrally with the side plates 3 and 4 by insert molding, or fixed thereto with fixing means such as an adhesive. Each of the connecting plates 11a to 11c has, in its position facing the center of the cell 10, an electrode column through hole 12 that allows insertion and connection of an electrode column of the cell. Moreover, the side plates 3 and 4 each have a connection opening 13 formed so as to face the center of the cell 10. The connection opening 13 of the side plate 3 has its one side elongated to form an inlet opening 13a. Of the connection openings 13, the one located in a region where the connecting plates 11a to 11c are disposed makes the connecting plates 11a to 11c exposed, whereas the one located on each of the end portions of the side plate 3 is formed as a through hole.

Figure 4B:
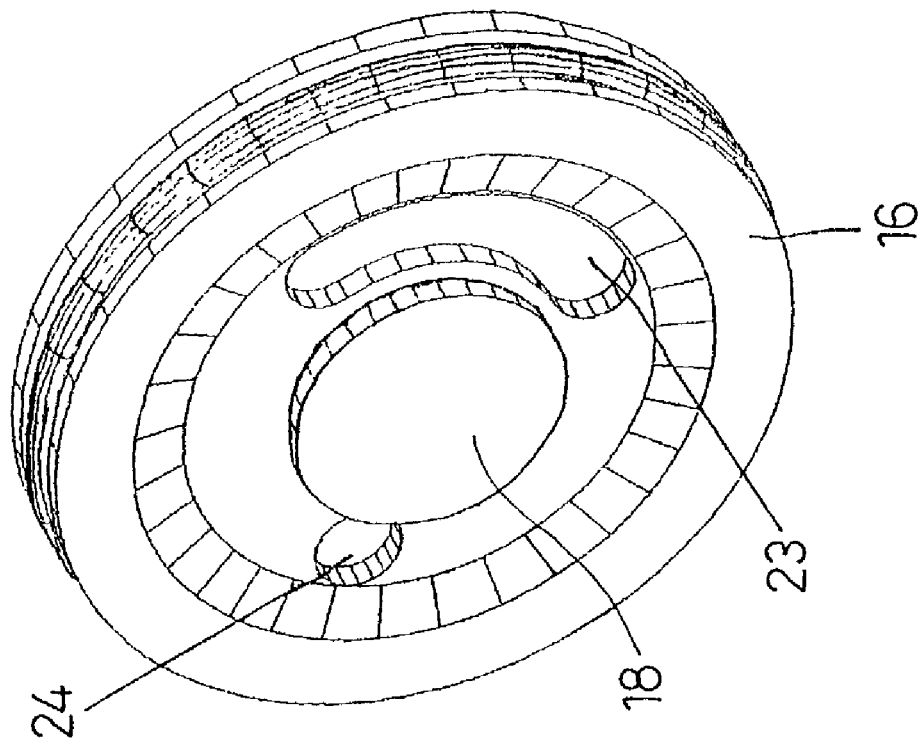
Figure 4A:
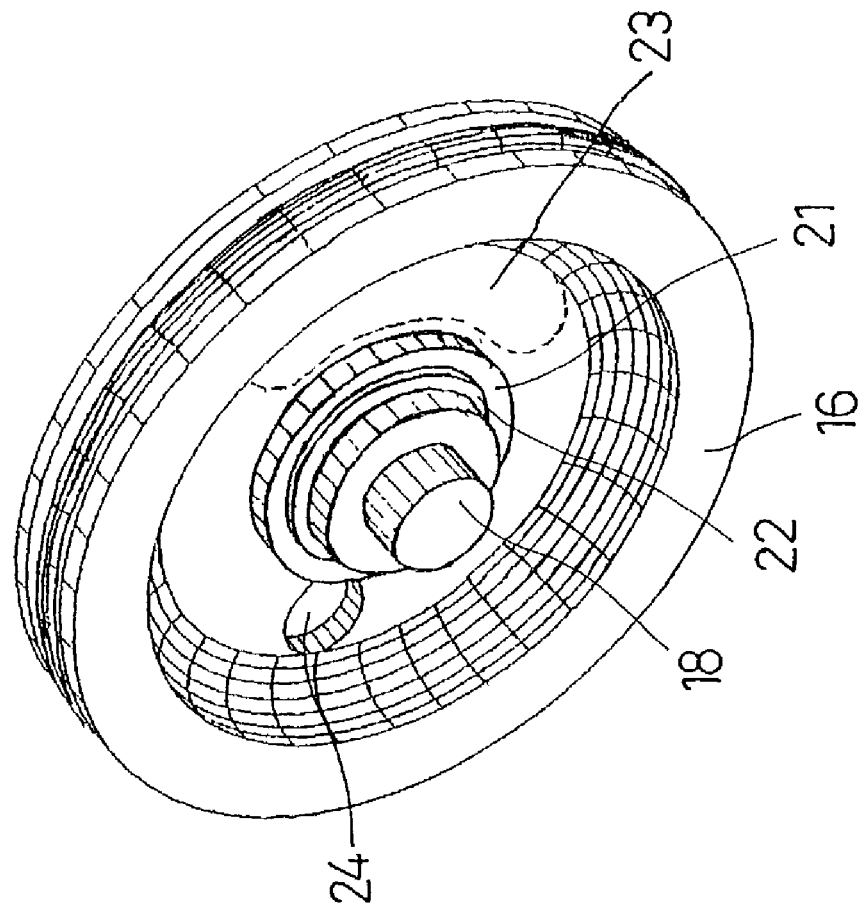

As shown in FIG. 3, the battery element 9 includes: the electrode plate group 8 composed of a winding of positive and negative electrode plates, with a polyethylene-made separator interposed therebetween; positive and negative current collectors 14 disposed at the opposite ends of the electrode plate group 8; an insulating ring 15 having an L-shaped cross section and having a collar 15a formed so as to protrude toward its inner periphery, the collar 15a abutting against the outer peripheral portion of the current collector 14; and an aluminum- or aluminum alloy-made sealing member 16 disposed outside the insulating ring 15. In addition, the battery element 9 includes an O ring 17, an electrode column 18, a lead plate 20, an insulating washer 21 and a clamping ring 22. The O ring 17 is fitted in a sealing groove formed at the outer periphery of the sealing member 16, to provide a seal with respect to the inner periphery of the electrode plate group housing chamber 5. The electrode column 18 acts as a positive terminal or a negative terminal. The electrode column 18 is attached via an insulating gasket 19 to the sealing member 16 in such a way that the electrode column 18 passes through the central part of the sealing member 16. The lead plate 20 has its one end welded to the current collector 14, and has its other end welded to the electrode column 18, to provide connection between the two components 14 and 18. The insulating washer 21 and the clamping ring 22 fix the electrode column 18 and the sealing member 16 to each other. As shown in FIGS. 4A and 4B, the sealing member 16 is provided with an explosion-proof valve 23 formed of a thin-walled portion, and an inlet 24. Note that the inlet 24 is closed with sealing means (not shown), such as a screw with a seal, after injection of electrolyte.

According to the battery module 1 thus constructed, after the battery elements 9 are housed in their corresponding electrode plate group housing chambers 5 constituting the battery case 2, the side plates 3 and 4 are arranged in abutment with both side faces 2a of the battery case 2. Then, by screw-fixing the battery case 2 and the side plates 3 and 4 to each other using the mounting holes 6 and 7, the opening of each of the electrode plate group housing chambers 5 is closed. In this state, the electrode column 18 of the battery element 9 passes through the electrode column through hole 12 formed in the connecting plate 11a to 11c of the side plate 3, 4, and, as shown in FIG. 3, the electrode column 18 is fastened to the connecting plate 11a to 11c using a nut 25. Subsequently, an electrolyte is poured, through the inlet opening 13a of the side plate 3 and the inlet 24 of the sealing member 16, into the electrode plate group housing chamber 5. After the electrode plate group 8 is impregnated with the electrolyte, the inlet 24 is closed. Whereupon, the cell 10 is constituted in each of the electrode plate group housing chambers 5, and simultaneously the battery module is fabricated.

As described heretofore, according to the embodiment, the cells 10 and the battery module 1 are fabricated concurrently. Moreover, since the battery case 2 for accommodating the cells 10 serves also as a holding member for holding the cells 10, a remarkable reduction in the numbers of constituent components and assembly man-hours is achieved. This makes cost cutting possible. Particularly, at each end of the electrode plate group 8, the sealing member 16 having the O ring 17 formed at its outer periphery is disposed, to secure a seal with respect to the inner periphery of the cylindrical electrode plate group housing chamber 5. In addition, the sealing member 16 is provided with the explosion-proof valve 23 formed of a thin-walled portion. This arrangement makes it possible to fabricate the battery module 1 of cylindrical battery having an explosion-proof function, in a productive and efficient manner.

Further, since the side plate 3, 4 is provided with the connecting plate 11a to 11c for providing connection between the cells 10, the cells 10 are connected together simply by arranging the side plates 3 and 4. This eliminates the addition of connecting operations for the cells, thereby making it possible to achieve further miniaturization and cost reduction.

(Second Embodiment)

Next, a second embodiment of the present invention will be described with reference to FIGS. 5 and 6. Note that, in the descriptions connected to the second embodiment, such elements as are found also in the previous embodiment are identified with the same reference numerals and symbols, and the descriptions thereof will be omitted. That is, only the points of difference will be described below.

In this embodiment, in a dead space between the cylindrical wall surface constituting the electrode plate group housing chamber 5 within the battery case 2 and the peripheral wall of the battery case 2, a fluid flow passage 26 is piercingly formed in between the side faces 2a and 2b. Moreover, the side plate 3, 4 has an opening window 27, acting as an inlet-outlet port for a fluid, formed so as to face the opening end of the flow passage 26.

Figure 6:
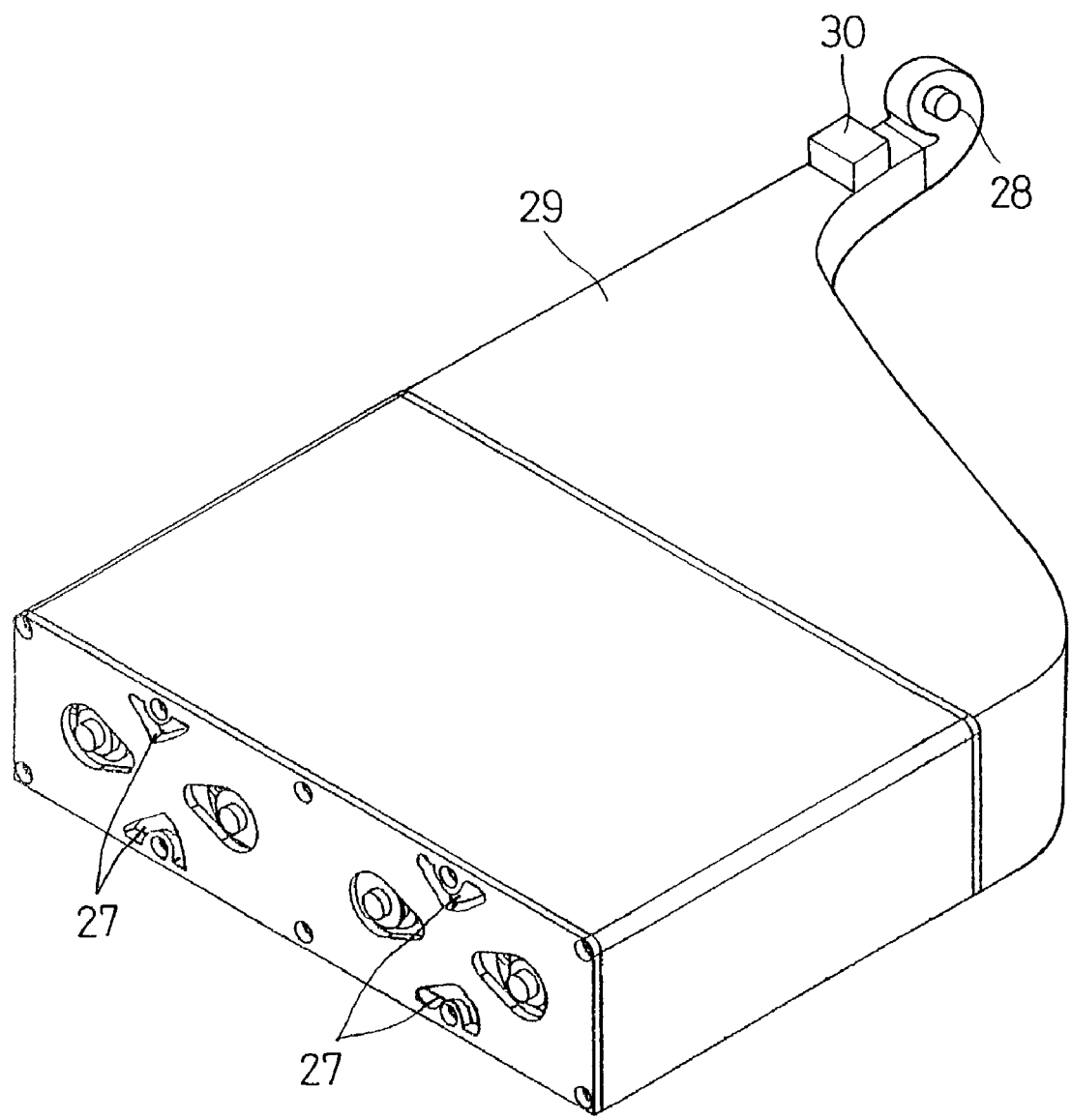
FIG. 6 is a perspective view showing the entire structure of the battery module.

In order to feed temperature-controlled air, as a heating medium, into the flow passage 26, as shown in FIG. 6, a fan 28, an air duct 29, and a Peltier element 30 are disposed. The air duct 29 directs an air blown out by the fan 28 toward the opening window 27 of the side plate 4. The Peltier element 30 is disposed in the air duct 29, as a temperature adjusting member, to adjust the temperature of the blown air. Note that, although not shown in the figure, a heat exchanging fin is extended from the Peltier element 30 into the air duct 29 to adjust a temperature of air efficiently.

According to the second embodiment, by allowing the air having undergone temperature adjustment by the Peltier element 30 to flow through the flow passage 26 of the battery case 2, the temperature of the cell 10 is maintained at a predetermined level. This helps prolong the working life of the battery module 1 and also improve its output characteristics. For example, in the case of a lithium ion battery, by adjusting its temperature within the range of 25° C.±10° C., optimal output characteristics are achieved.

(Third Embodiment)

Next, a third embodiment of the invention will be described with reference to FIGS. 7 through 9.

Figure 7:
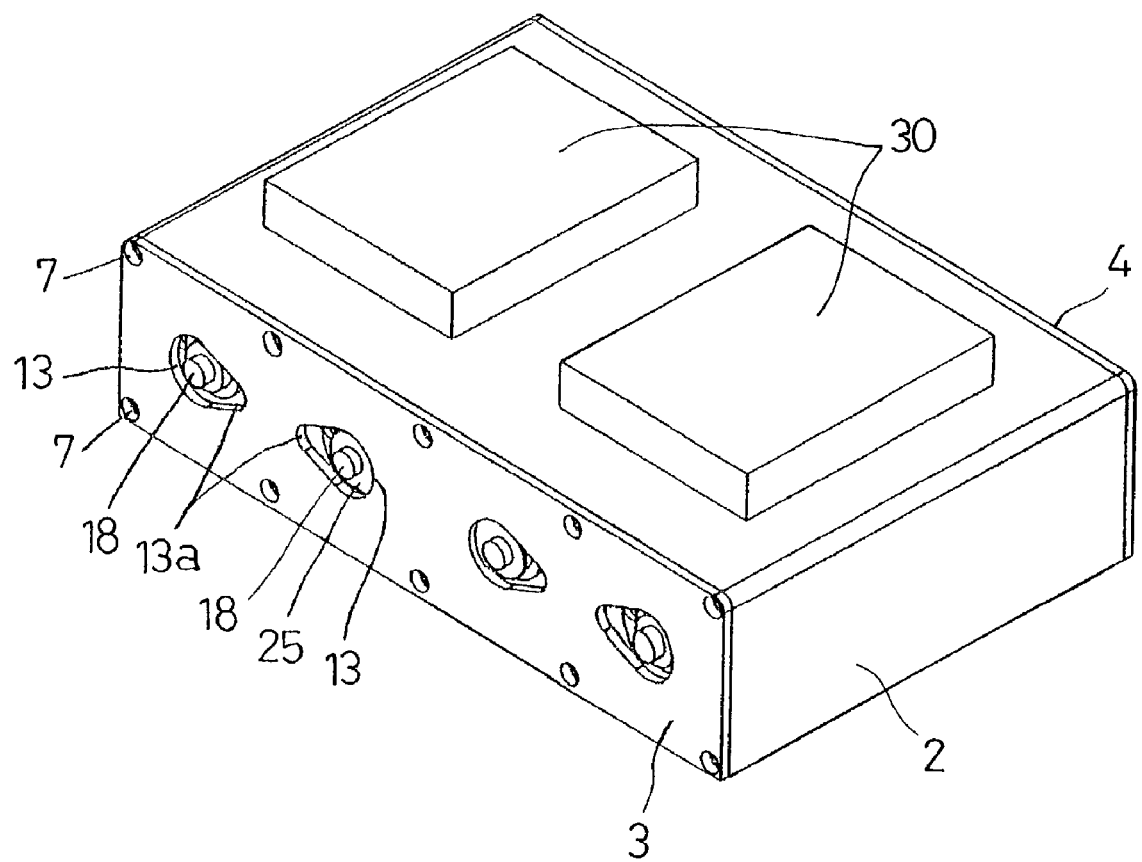
FIG. 7 is a perspective view showing a battery module according to a third embodiment of the invention.

In this embodiment, as shown in FIG. 7, the Peltier element 30 is disposed in contact with the outer surface of the battery case 2. In this construction, the battery case 2 is temperature-controlled directly by the Peltier element 30, and thus the cells 10 are temperature-controlled efficiently and uniformly through the battery case 2 made of aluminum or aluminum alloy having high thermal conductivity. This helps prolong the working life of the battery module 1 and also improve its output characteristics.

Figure 8:
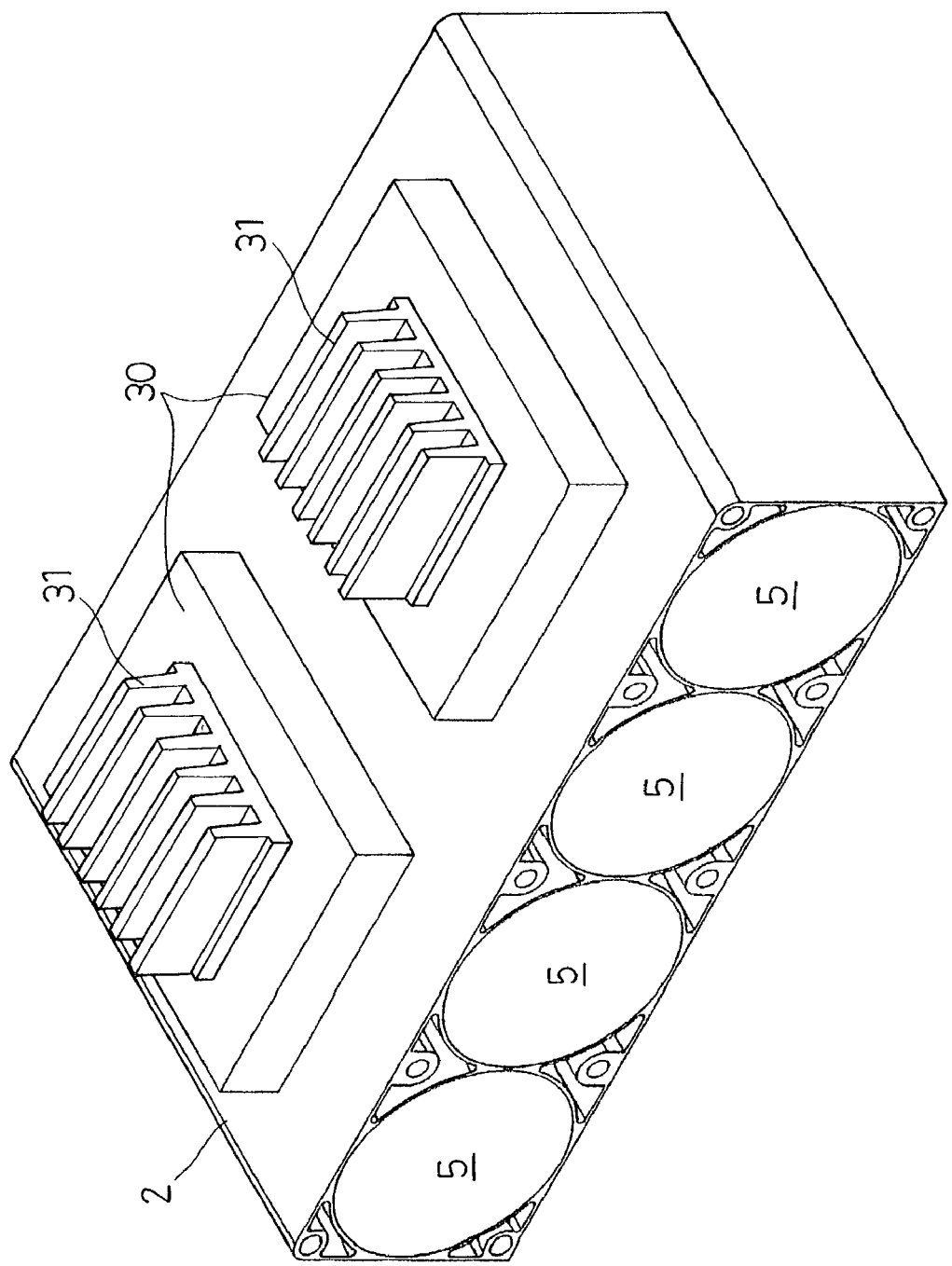
FIG. 8 is a perspective view showing a battery case of one modified example of the third embodiment.

As shown in FIG. 8, it is more preferable that a heat-dissipating fin 31 be arranged, as a heat exchanger, on one surface of the Peltier element 30 opposite to the other surface thereof making contact with the battery case 2. This helps improve the heat-exchange efficiency of the Peltier element 30.

Figure 9:
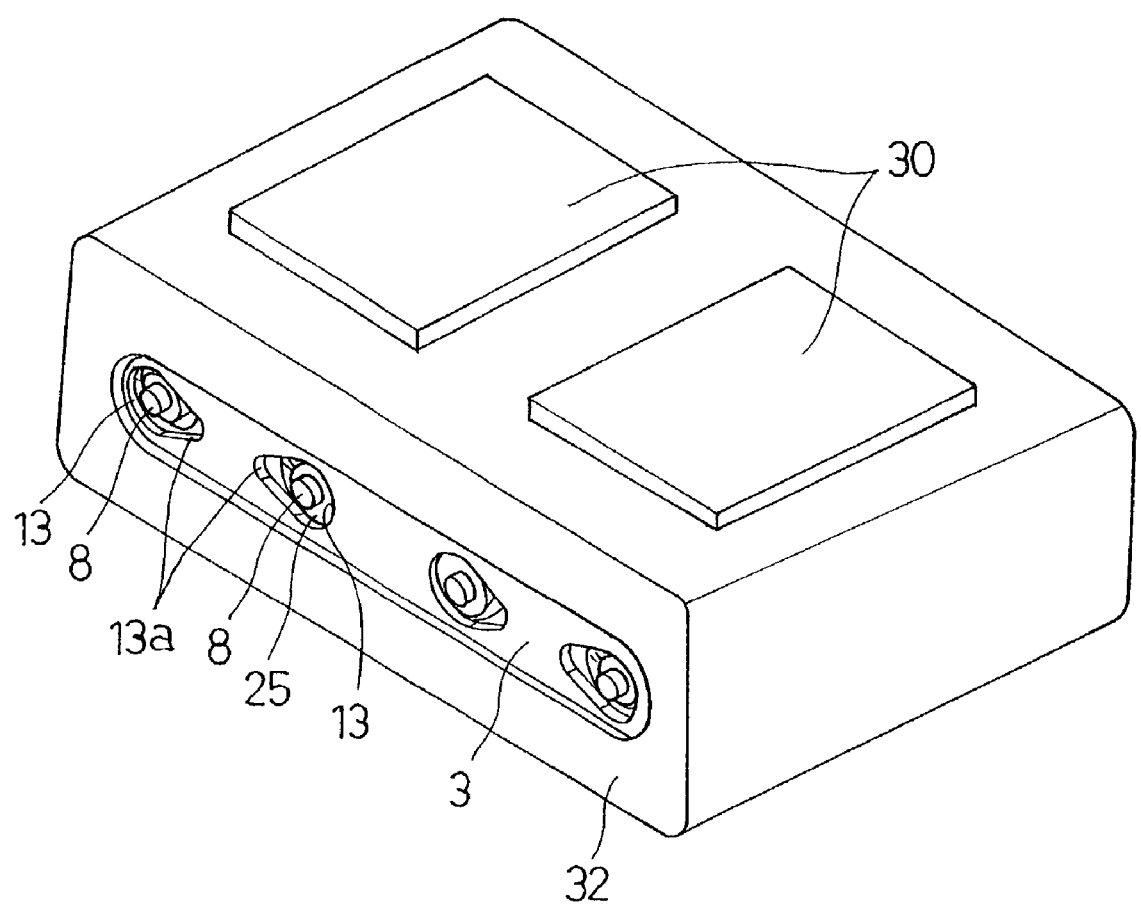
FIG. 9 is a perspective view showing another modified example of the third embodiment.

Moreover, as shown in FIG. 9, it is preferable that the outer surface of the battery case 2 be covered with a heat insulating material 32, such that the Peltier element 30 is exposed. By so doing, the battery becomes less prone to being adversely affected by a temperature of an environment where the battery is arranged. Thereby, temperature adjustment is achieved properly and efficiently, resulting in decreased power consumption in the Peltier element 30.

(Fourth Embodiment)

Figure 10:
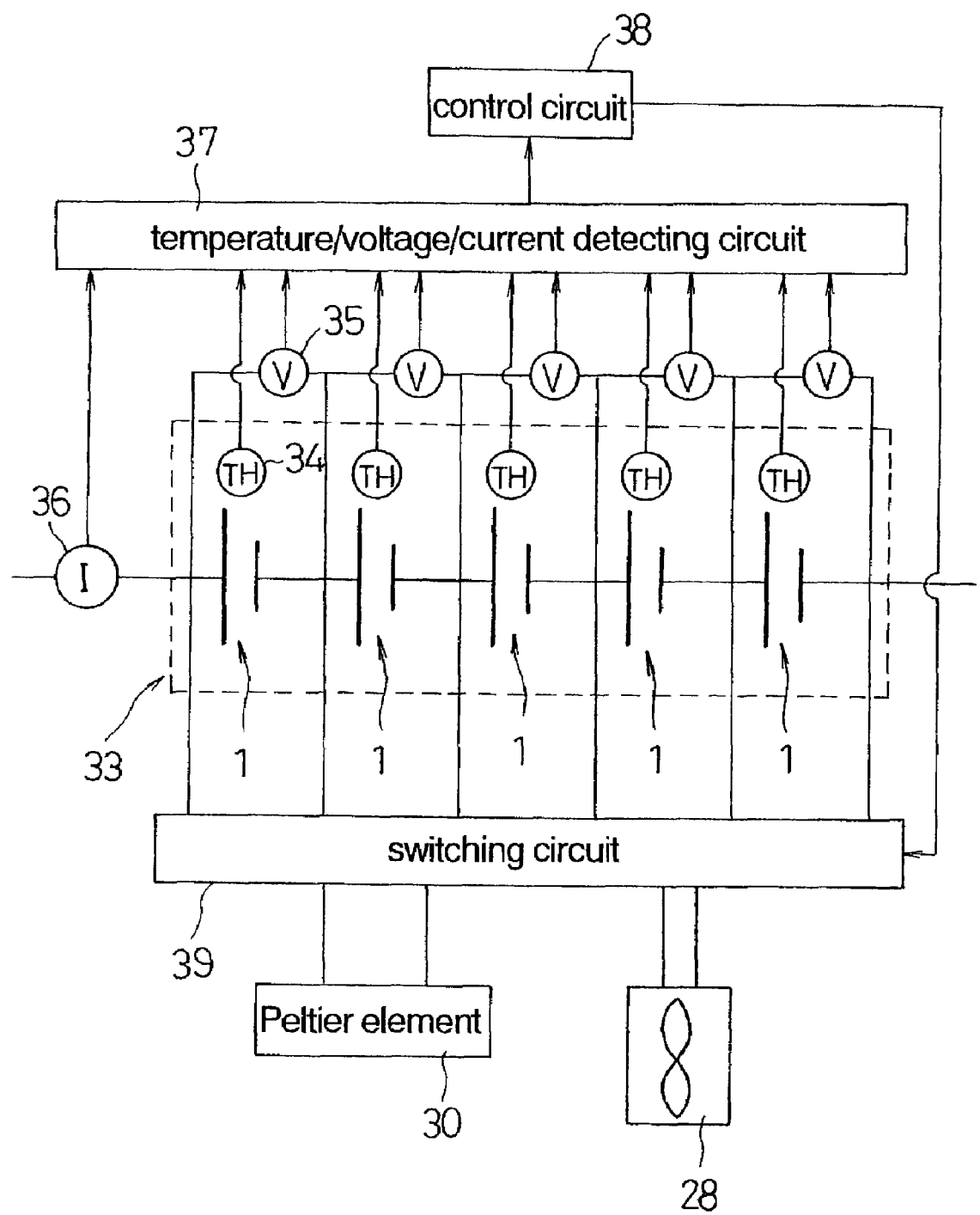
FIG. 10 is a block diagram showing a temperature adjusting member of a battery module of a fourth embodiment of the invention.
Figure 11:
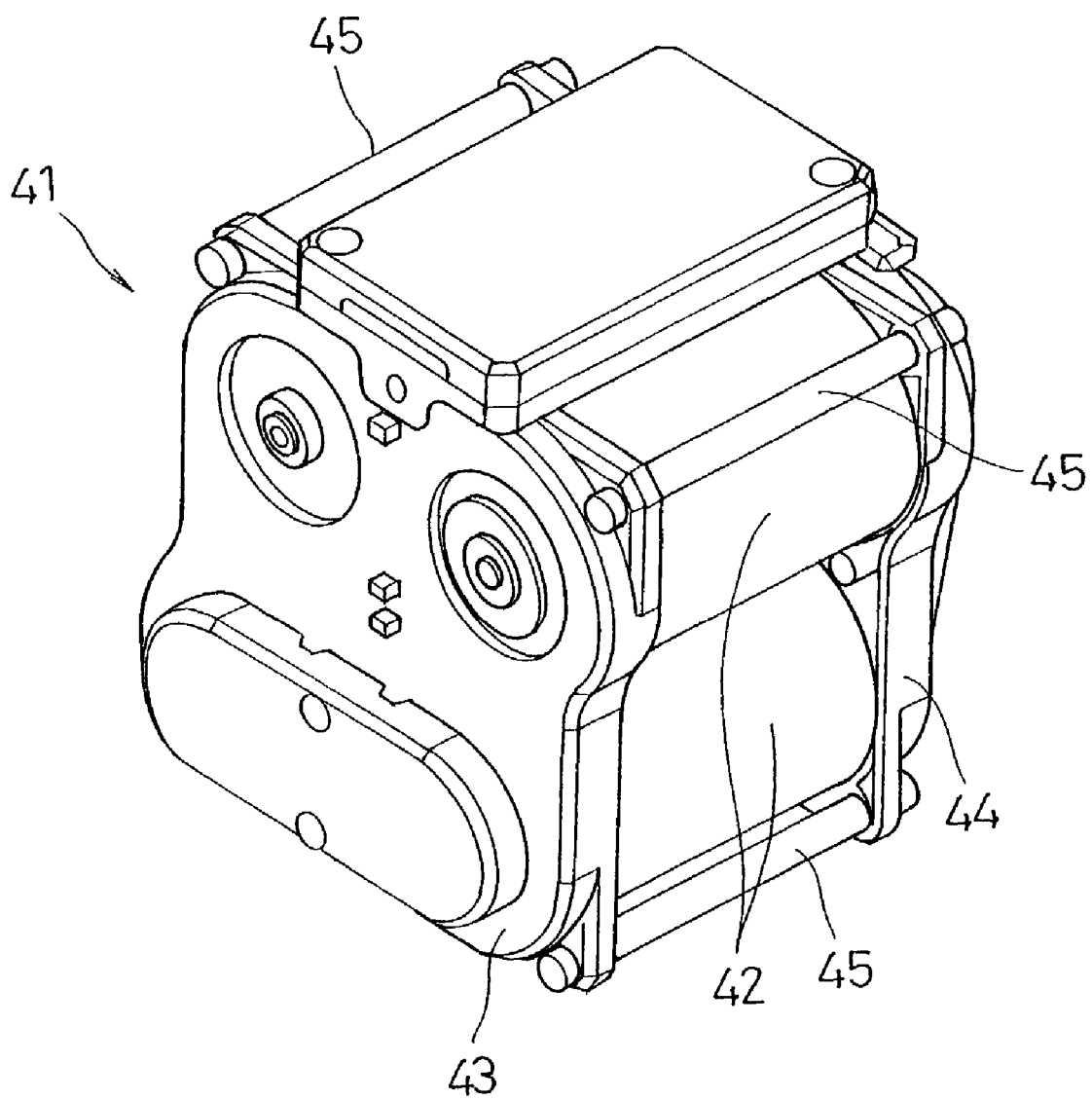
FIG. 11 is a perspective view showing a battery module of a conventional example.

Next, a fourth embodiment of the invention will be described with reference to FIG. 10.

In this embodiment, a battery unit 33 is constructed by connecting a plurality (five pieces, in the illustrated example) of battery modules 1 in series with one another. A temperature detecting sensor 34 and a voltage detecting sensor 35 are provided for each of the battery modules 1. Moreover, a current detecting sensor 36 is provided for the battery unit 33. Signals detected by these detecting sensors 34, 35, and 36 are inputted to a temperature/voltage/current detecting circuit 37, and the detection results are inputted to a control circuit 38. Under the control of the control circuit 38, a switching circuit 39 is so operated that a power is extracted preferentially from, of the battery modules 1, the one in its high-voltage or fully-charged state. The extracted power is used to drive the fan 28 and the Peltier element 30, so that the temperature is adjusted in accordance with the temperature status of each of the battery modules 1 that has been detected by the temperature detecting sensor 34.

According to the fourth embodiment, the temperature of the battery module 1 is detected, and, based on the detected battery temperature, the current direction and current value with respect to the Peltier element 30 are controlled. In this way, temperature adjustment is achieved properly in accordance with the temperature status of the battery. Moreover, extracting a power required for actuating the Peltier element 30 from the battery unit 33 does away with the need to secure an extra power source designed for temperature adjustment. This helps simplify the entire configuration. Further, since the power for actuating the Peltier element 30 is extracted preferentially from the battery module 1 in its high-voltage or fully-charged state, the charge statuses of the individual battery modules 1 are leveled out. This makes it possible to prolong the working life of the battery unit 33, as well as that of the battery module 1 constituting the battery unit 33.

In this embodiment, a plurality of battery modules 1 are connected in series to constitute a unit, and detection of temperature and voltage is separately performed for each of the battery modules 1 to control the operations of the fan 28 and the Peltier element 30 acting as a temperature adjusting member. It is needless to say, however, that the control operations may be performed on a cell-to-cell basis, instead of the module-to-module basis.

The battery modules according to the present invention, as exemplified by the above-described embodiments, are applicable to various batteries such as a lithium ion battery, a nickel-metal hydride battery, and a nickel cadmium battery. Moreover, the invention is applicable to battery modules other then cylindrical batteries.

According to the battery module of the invention, the cells and the battery module are fabricated concurrently, and the battery case for accommodating the cells serves also as a holding member for holding the cells. Thus, a remarkable reduction in the numbers of constituent components and assembly man-hours is achieved, leading to cost cutting.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising:
   a battery case having chamber interior walls defining a plurality of electrode plate group housing chambers, said battery case having opposing side faces each defining opposing chamber end openings of said electrode plate group chambers;
   an unsealed electrolyte-impregnated electrode plate group housed in each of the electrode plate group housing chambers, for constituting a cell, walls of the electrode plate group housing chambers acting to form a sealed environment sealing each of the unsealed electrolyte-impregnated electrode plate groups and an electrolyte of the electrolyte-impregnated electrode plate groups;
   said electrolyte-impregnated electrode plate groups each having a sealing member disposed at a first end of the electrolyte-impregnated electrode plate group in each of the electrode plate group housing chambers, said sealing member having a sealing material formed at an outer periphery of a circumference of said sealing member and securing a seal on an interior surface of the chamber interior wall of the electrode plate group housing chamber in which the sealing member is disposed;
   the sealing member being provided with an explosion-proof valve formed of a thin-walled portion; and
   a side plate arranged in abutment with each of the side faces or the battery case closing the openings of the electrode plate group housing chambers to retain the electrolyte-impregnated electrode plate groups and the sealing members thereof in the electrode plate group housing chambers.

2. The battery module according to claim 1, wherein the side plate includes a connecting plate for providing connection between the cells.

3. The battery module according to claim 1, wherein the electrolyte-impregnated electrode plate group is composed of:

a winding of positive and negative electrode plates, with a separator interposed therebetween; and a sealing member disposed at a second end of the electrolyte-impregnated electrode plate group in each of the electrode plate group housing chambers having a sealing material formed at an outer periphery securing a seal on an interior surface of the chamber interior wall of the electrode place group housing chamber.

4. The battery module according to claim 1, wherein the battery case includes a fluid flow passage.

5. The battery module according to claim 4, further comprising:
a device for feeding a fluid into the fluid flow passage of the battery case; and
a temperature adjusting member for adjusting a temperature of the fluid.

6. The battery module according to claim 1, wherein a temperature adjusting member is disposed on an outer surface of the battery case.

7. The battery module according to claim 1, wherein the battery case is made of a material having a thermal conductivity higher than that of a steel material.

8. The battery module according to claim 5 or claim 6, wherein the temperature adjusting member includes a Peltier element.

9. The battery module according to claim 8, further comprising a temperature detecting device for detecting a temperature of the cell or the battery module as a whole, wherein the temperature adjusting member controls a current direction and a current value with respect to the Peltier element, based on a detected temperature.

10. The battery module according to claim 8, wherein the battery module is covered with a heat insulating material.

11. The battery module according to claim 8, wherein a heat exchanger is arranged on a first surface of the Peltier element opposite to a second surface of the Peltier element making contact with the battery case.

12. The battery module according to claim 8, wherein a power for driving the temperature adjusting member is extracted from the battery module.

13. The battery module according to claim 12, further comprising a controller controlling power for driving the temperature adjusting member and selecting one of said electrolyte-impregnated electrode plate groups from which to draw said power based on a charge state of said selected one of said electrolyte-impregnated electrode plate groups being in a high-voltage or fully-charged state.

14. The battery module according to claim 1, wherein:
the side plates each have a side plate inner planar surface abutting respective ones of the side faces of the battery case and said side plate inner planar surface also abutting the sealing members;
the side plate inner planar surface includes a recess and a connecting plate disposed in the recess; and
said connecting plates electrically interconnecting the cells.

15. The battery module according to claim 1, wherein:
said electrolyte-impregnated electrode plate groups each include a winding assembly of positive and negative electrode plates having a separator interposed therebetween;
said sealing members are disposed at a first end of the windings, include a terminal and an insulating element abutting the winding assembly and said spacing the terminal from the winding assembly, and a lead plate in the spacing between the terminal and the winding assembly and interconnecting said terminal and said winding assembly; and
one of the side plates is arranged in abutment with the seating members so as to thereby retain the electrolyte-impregnated electrode plate groups in the electrode plate group housing chambers.

16. The battery module according to claim 1, wherein:
the sealing members each being provided with an inlet opening through which the electrolyte is introduced into a corresponding one of the electrode plate group housing chambers;
said inlet opening being disposed set apart from said explosion-proof valve; and said inlet opening having a sealing device disposed therein to place the inlet opening into a closed state sealing the electrode plate coup housing chamber.

17. The battery module according to claim 16, wherein at least one of the side plates has an opening aligned with at least one of said inlet openings permitting access to the at least one of the inlet openings from outside of the battery module to allow disposal of the electrolyte into a corresponding one of the electrode plate group housing chambers.

18. The battery module according to claim 17, wherein:
said sealing members each include a terminal electrically connected to said electrolyte-impregnated electrode plate groups;
the side plates each have a connecting plate disposed in a recess; and
said connecting plates electrically interconnect the cells and have apertures through which the terminals are disposed.

19. The battery module according to claim 18, wherein:
said electrolyte-impregnated electrode plate groups each include a winding assembly of positive and negative electrode plates having a separator interposed therebetween;
said sealing members are disposed at a first end of the windings, said sealing members include said terminal and an insulating clement abutting the winding assembly and spacing the terminal from the winding assembly, and a lead plate in the spacing between the terminal and the winding assembly and interconnecting said terminal and said winding assembly; and
one of the side plates is arranged in abutment with the sealing members so as to thereby retain the electrolyte-impregnated electrode plate groups in the electrode plate group housing chambers.

20. The battery module according to claim 16, wherein:
said sealing members each include a terminal electrically connected to said electrolyte-impregnated electrode plate groups;
the side plates each have a connecting plate disposed in a recess; and
said connecting plates electrically interconnecting the cells and having apertures through which the terminals are disposed.

21. The battery module according to claim 16, wherein said sealing device is a screw and seal compressed by said screw.

* * * * *